United States Patent
Anderson et al.

(10) Patent No.: US 6,869,543 B2
(45) Date of Patent: Mar. 22, 2005

(54) AMINE-INITIATED POLYETHER POLYOLS AND A PROCESS FOR THEIR PRODUCTION

(75) Inventors: Nathan L. Anderson, Charleston, WV (US); Karl W. Haider, Hurricane, WV (US); Keith J. Headley, Paden City, WV (US); Kerry A. Ingold, Pittsburgh, PA (US); Herman P. Doerge, Moon Township, PA (US)

(73) Assignee: Bayer Polymers LLC, Pittsburgh, PA (US)

(*) Notice: Subject to any disclaimer, the term of this patent is extended or adjusted under 35 U.S.C. 154(b) by 40 days.

(21) Appl. No.: 10/372,361

(22) Filed: Feb. 21, 2003

(65) Prior Publication Data

US 2004/0167316 A1 Aug. 26, 2004

(51) Int. Cl.$^7$ ................................................. C09K 3/00
(52) U.S. Cl. .......................... 252/182.26; 252/182.24; 252/182.27; 252/182.28; 528/76; 564/437; 568/606; 568/607; 568/608; 568/630
(58) Field of Search ................................ 568/606, 607, 568/608, 630; 528/76; 564/437; 252/182.24, 182.26, 182.27, 182.28

(56) References Cited

U.S. PATENT DOCUMENTS

| 4,391,728 A | 7/1983 | Korczak et al. ............ 252/182 |
| 4,430,490 A | 2/1984 | Doerge .......................... 528/77 |
| 4,562,290 A | 12/1985 | Korczak et al. ............. 564/399 |
| 4,877,879 A | 10/1989 | Gansow ........................ 544/402 |
| 5,786,405 A | 7/1998 | Schilling et al. ............. 521/167 |
| 6,284,812 B1 * | 9/2001 | Rotermund et al. ......... 521/174 |

OTHER PUBLICATIONS

Japanese Abstract, 57168918, Oct. 18, 1982, Polyether polyols for rigid polyurethane foams.

Japanese Abstract, 57168917, Oct. 18, 1982, Polyether polyol for polyurethane foams.

* cited by examiner

*Primary Examiner*—John M. Cooney, Jr.
(74) *Attorney, Agent, or Firm*—Joseph C. Gil; Jennifer R. Seng

(57) ABSTRACT

Clear, amine-initiated polyether polyols are made by epoxidizing an amine in the presence of an alkali metal hydroxide catalyst. By reducing the amount of catalyst used during the polyol synthesis and by adding the catalyst after between 5 and 30% of the total amount of at least one alkylene oxide has been added, after lactic acid neutralization, gives a short chain polyol that has foam processing characteristics similar to the conventional sulfuric acid neutralized polyol. The polyols produced in this manner are particularly useful for the production of polyurethane and polyisocyanurate foams.

26 Claims, No Drawings

AMINE-INITIATED POLYETHER POLYOLS AND A PROCESS FOR THEIR PRODUCTION

FIELD OF THE INVENTION

The present invention relates to clear, amine-initiated polyether polyols, to a process for their production and to the use of those polyether polyols in the production of molded rigid foams.

BACKGROUND OF THE INVENTION

Polyether polyols are known to be useful in the production of rigid polyurethane and polyurethane-polyisocyanurate foams. In one of the most common methods for the production of these polyols, a polyhydric alcohol such as sucrose is reacted with an alkylene oxide such as ethylene oxide or propylene oxide in the presence of an alkaline catalyst such as sodium hydroxide. Prior to use in the production of foams, any alkaline catalyst present in the polyol must be neutralized and/or removed to ensure that the catalyst will not interfere with the reaction between polyol and another reactive material such as a polyisocyanate. This is generally accomplished by addition of an acid to neutralize the alkaline catalyst. This neutralization frequently results in the precipitation of a solid salt in the polyol which salt may be removed by filtration. The removed solid is commonly called the filter cake. Traditionally, sulfuric acid has been used to neutralize polyols.

U.S. Pat. No. 4,430,490 discloses a process for producing a polyether polyol from a polyhydric alcohol in which the alkaline catalyst is neutralized with a hydroxy-carboxylic acid, which is soluble in the polyol. The use of this hydroxy-carboxylic acid to neutralize the alkaline catalyst makes it possible to obtain a clear polyol product, which does need to be filtered before use and does not contribute to the generation of a filter cake requiring disposal. U.S. Pat. No. 4,430,490 is, however, limited to the production of polyether polyols from polyhydric alcohols such as sucrose.

U.S. Pat. No. 4,521,548 teaches that the alkaline catalyst used to produce the polyether polyols disclosed therein may be neutralized with formic acid. The benefit of neutralization with formic acid is also the solubility of the reaction product of the formic acid and alkaline catalyst in the product polyol.

Japanese Abstracts 57168917A and 57168918 each teach that neutralization of the alkaline catalyst used in the production of the amine-initiated polyethers disclosed therein may be achieved by the addition of oxalic acid in quantities sufficient to neutralize the alkaline catalyst. Some of the oxalate salts formed, however, are insoluble in the product polyol. After the catalyst is neutralized by oxalic acid, the product must be degassified to obtain the polyether polyol.

U.S. Pat. No. 4,877,879 teaches that neutralization of the alkaline catalyst used in the production of the amine-initiated polyethers disclosed therein may be achieved by adding formic acid in a substantial (i.e., greater than 300%) stoichiometric excess with respect to the amount of alkaline catalyst to be neutralized. The formic acid not only produces a salt, which is soluble in the product amine but also hydrogen, which is taught to contribute to the stability of the polyether.

U.S. Pat. No. 5,786,405 discloses a process for the production of a clear amine initiated polyether polyol by epoxidizing an amine in the presence of potassium hydroxide and upon completion of epoxidation, adding lactic acid to the epoxidized mixture in an amount sufficient to neutralize any remaining alkali metal hydride. It is beneficial to neutralize polyols with lactic acid because during neutralization, lactic acid produces a lactate salt, such as potassium lactate, which is soluble in the polyol and therefore does not require an additional process step to remove. However, the major problems observed with lactic acid neutralized polyols are the increased reactivity and high pressure during the polyurethane foam forming reaction. High reactivity results in insufficient flow and therefore incomplete filling of the cavities of the mold, while increased pressure can lead to deformation of the finished parts, particularly when foam is poured behind a thin shell, as in applications such as doors and water heaters.

Surprisingly, it has now been found that reducing the amount of catalyst used during the polyol synthesis and adding the catalyst earlier in the epoxidation reaction, gives, after lactic acid neutralization, a short chain polyol that has foam processing characteristics similar to the conventional sulfuric acid neutralized polyol.

SUMMARY OF THE INVENTION

It is an object of the present invention to provide a clear, amine-initiated polyether polyol in which any residual alkaline catalyst from the polyol production process is neutralized.

It is also an object of the present invention to provide a process for the production of a clear, amine-initiated polyether polyol in which any residual alkaline catalyst is neutralized in a manner, which does not generate large quantities of solid waste.

It is a further object of the present invention to provide a process for the production of amine initiated lactic acid neutralized polyols, which have processing characteristics, during polyurethane rigid foam formation, similar to those of sulfuric acid neutralized polyols. These and other objects which will be apparent to those skilled in the art are accomplished by epoxidizing an amine, such as toluene diamine (TDA), in the presence of an alkaline catalyst, wherein the alkaline catalyst is added in a smaller amount and is added earlier in the epoxidation process than in the conventional sulfuric acid neutralized process. Upon completion of the epoxidation, a hydroxy carboxylic acid is added in an amount sufficient to neutralize any alkaline catalyst remaining.

DETAILED DESCRIPTION OF THE INVENTION

The present invention relates to clear, amine-initiated polyether polyols, which are substantially free of residual alkaline catalyst. These polyether polyols contain salts of hydroxy-carboxylic acids which are soluble in the polyether polyol and which do not interfere with subsequent reactions of the polyol with other reactive materials.

The polyols of the present invention are prepared by reacting an alkylene oxide with an amine having an amine functionality of at least 2 in the presence of an alkaline catalyst. According to the present invention the alkaline catalyst is added after between 5 and 30 percent of the total alkylene oxide addition. The amount of alkaline catalyst added is from about 0.001 to 0.1 weight percent, based upon the weight of the finished polyol, preferably, from about 0.03 to about 0.07 weight percent, based upon the weight of the finished polyol.

The amines useful in the practice of the present invention have an amine functionality of at least 1, preferably from about 1 to about 3, more preferably from 1 to 2. A primary amine, R—NH$_2$, reacts with epoxides to give two hydroxyl groups. For example, RNH$_2$ can react with 2 moles of ethylene oxide to yield HO—CH$_2$CH$_2$—NR—CH$_2$CH$_2$OH. Therefore, an amine functionality of 1 in this case gives a polyol functionality of 2. Examples of suitable amines include, but are not limited to, aromatic amines such as crude toluene diamine obtained by the nitration of toluene followed by reduction, 2,3-toluene diamine, 3,4-toluene diamine, 2,4-toluene diamine, and 2,6-toluene diamine or mixtures thereof, aniline, 4,4'-methylene dianiline, methylene-bridged polyphenyl polyamines composed of isomers of methylene dianilines and triamines or polyamines of higher molecular weight prepared by reacting aniline with formaldehyde by methods known in the art, ammonia, alkanol amines such as monoethanol amine, diethanolamine, triethanolamine, organic amines such as methyl amine, ethylene diamine, diethylene triamine and the like, and Mannich reaction products of phenol or substituted phenols with alkanol amines and formaldehyde or paraformaldehyde. Mixture of the above amines may also be used. Mixtures of 2,3-toluene diamine and 3,4-toluene diamine (also known as o-TDA) are preferred.

Examples of alkylene oxides useful in producing the polyether polyols of the present invention include: ethylene oxide, propylene oxide, butylene oxide, and mixtures of these alkylene oxides. The alkylene oxides may be added as mixtures or added sequentially to produce block copolymers. Preferably, first about 20–40% of ethylene oxide is added, based on the total amount of alkylene oxide to be added, then about 60–80% of propylene oxide is added, based on the total amount of alkylene oxide to be added.

In principle, any alkaline material capable of catalyzing the epoxidation reaction of the present invention may be used. Specific alkaline catalysts which have been found to be particularly suitable include potassium hydroxide, cesium hydroxide and sodium hydroxide.

The epoxidation reaction, according to the present invention, occurs by contacting the amine having an amine functionality of at least 1 with the alkylene oxide(s) at an elevated temperature in the range of from 90 to 180° C. under moderately elevated pressure in the presence of the alkaline catalyst. According to a preferred process of the present invention the alkylene oxide is a block of ethylene oxide, preferably about 20–40% of the total oxide to be added, which is followed by a block of propylene oxide, preferably about 60–80% of the total oxide to be added. Preferably, after about 5 to 30% of the total alkylene oxide to be added is contacted with an amine and allowed to react, then from about 0.001 to 0.1 weight percent of the catalyst, based on the weight of the finished polyol, is added to the epoxidizing mixture, finally, the remaining amount of alkylene oxide is added to complete the epoxidation of the polyol.

The epoxidation product generally has an average hydroxyl value of at least 200, preferably in the range of from about 300 to about 500. The molecular weights of the polyether polyols of the present invention (number average determined by end group analysis and nominal functionality of the polyol) generally range from about 150 to about 1200, preferably from about 200 to about 800, most preferably from about 500 to about 700.

After the polyol has been prepared, the resultant reaction mixture that contains the alkaline catalyst in amounts of from about 0.001 to about 0.099 wt. % is neutralized with a hydroxy-carboxylic acid. Neutralization may be accomplished by mixing the hydroxy-carboxylic acid and reaction mixture at an elevated temperature, for example around 90° C., with stirring. Neutralization need not be exact neutrality (i.e., pH=7.0). The reaction mixture may be maintained at a slight basic or slight acidic pH, i.e., at a pH of from 2 to 9. The acid is added at a level of 0.70 to 1.30, preferably 1.05 to 1.15 equivalents of carboxylic acid per equivalent of the alkali metal hydroxide used for the alkoxylation. The neutralized catalyst must be soluble in the polyether polyol so that the product amine-initiated polyol may be used in polyurethane foam-forming equipment without subsequent treatment and without generating large amounts of solid waste material.

Examples of hydroxy carboxylic acids useful in the practice of the present invention include: lactic acid, salicylic acid, substituted salicylic acids such as 2-hydroxy 3-methyl benzoic acid, 2-hydroxy 4-methyl benzoic acid and combinations of these acids. Lactic acid is more preferred.

The neutralized polyether polyol reaction mixture of the present invention is clear, i.e., free from haze and may be used directly in processes for the production of polyurethane foams. Methods for the production of polyurethane foams from such polyether polyols are well known to those in the art.

Generally, a polyether polyol such as that produced in accordance with the present invention is reacted with an organic polyisocyanate in the presence of a blowing agent to produce a polyurethane foam. Any of the known organic polyisocyanates may be used in the present invention. Suitable polyisocyanates include aromatic, aliphatic and cycloaliphatic poly-isocyanates and combinations thereof. Representative of these types are diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, the isomers of hexahydrotoluene diisocyanate, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy4,4'-biphenylene diisocyanate, and 3,3'-dimethyldiphenylpropane4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylisocyanates.

A crude polyisocyanate may also be used in making polyurethanes, such as the crude toluene diisocyanate obtained by the phosgenation of a mixture of toluene diamines. Preferred undistilled or crude toluene polyisocyanates are disclosed in U.S. Pat. No. 3,215,652. Similarly, undistilled polyisocyantates, such as methylene bridged polyphenyl-polyisocyanates are useful in the present invention and are obtained by the phosgenation of polyphenylpolymethylenepolyamines obtained by the known process of the condensation of aromatic amines such as aniline with formaldehyde.

Suitable modified diisocyanates or polyisocyanates may be obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups.

More preferred polyisocyanates for making rigid polyurethanes are methylene-bridged polyphenyl polyisocyanates and prepolymers of methylene-bridged polyphenyl polyisocyanates, having an average functionality of from about 2.0 to about 3.5, preferably about 2.1 to about 3.1 isocyanate moieties per molecule and an NCO content of from about 28 to about 34% by weight, due to their ability to cross-link the polyurethane. The isocyanate index (ratio of equivalents of isocyanates to equivalents of active hydrogen-containing groups) is advantageously from about 0.9 to about 3.0, preferably about 1.0 to about 2.0 and most preferably from about 1.0 to about 1.5.

Blowing agents useful in the production of polyurethane foams from the amine-initiated polyether polyols of the present invention include: water, hydrofluorocarbons such as 1,1-dichloro-1-fluoroethane (HCFC-141b), 1-chloro-1,1-difluoroethane (HCFC-142b), chlorodifluoro-methane (HCFC-22), hydrofluorocarbons such as 1,1,1,3,3-pentafluoro-propane (HFC-245fa), 1,1,1,2-tetrafluoroethane (HFC-134a), 1,1,1,3,3,3-hexafluoropropane (HFC-236fa), 1,1,2,3,3,3-hexafluoropropane (HFC-236ea), 1,1,1,4,4,4-hexafluorobutane (HFC-356mffm), perfluorinated hydrocarbons such as perfluoropentane or perfluoro hexane, hydrocarbons such as isomers of pentane and cyclopentane or mixtures of the above. Water, HCFC-141b, HCFC-22, HFC-245fa or mixtures thereof are more preferred. Preferably, the amount of blowing agent used is sufficient to produce foams having a density in the range of from about 1.0 to about 10 pcf, preferably, form about 2 to about 5 pcf.

Other components useful in producing the polyurethanes of the present invention include catalysts, surfactants, pigments, colorants, fillers, antioxidants, flame retardants, stabilizers, and the like.

When preparing polyisocyantates foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters and alkylarylsulfonic acids. Such surfactants are employed in amounts sufficient to stabilize the foaming reaction mixture against collapse and the formation of large and uneven cells. Typically, about 0.5 to about 2 parts by weight of the surfactant per 100 parts polyol composition are sufficient for this purpose.

One or more catalysts are advantageously used. Any suitable urethane catalyst may be used including the known tertiary amine compounds and organometallic compounds. Examples of suitable tertiary amine catalysts include triethylenediamine, N-methylmorpholine, pentamethyl diethylenetriamine, dimethylcyclohexylamine, tetramethylethylenediamine, 1-methyl-4-dimethylaminoethyl-piperazine, 3-methoxy-N-dimethylpropylamine, N-ethylmorpholine, diethylethanolamine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include organomercury, organolead, organoferric and organotin catalysts, with organotin catalysts being preferred. Suitable organotin catalysts include tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, or certain tertiary amines may also optionally be employed herein. Such catalysts are used in an amount, which measurably increases the rate of reaction of the polyisocyanate. Typical amounts are about 0.1 to about 2.0 part of catalyst per 100 parts by weight of polyol. Examples of such catalysts include the potassium salts of carboxylic acids such as potassium octoate, and the tertiary amine N,N',N"-tris(3-dimethyl-aminopropyl) hexahydro-s-triazine.

The components described may be employed to produce rigid foam. The rigid foams of the present invention may be made in a one-step process by reacting all of the ingredients together at once, or foams can be made by the so-called "quasi prepolymer" method. In the one-shot process where foaming is carried out using machines, the active hydrogen containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi prepolymer" method. In this method a portion of the polyol component is reacted in the absence of catalysts with the polyisocyanate component in proportion so as to react from about 10 percent to about 30 percent of free isocyanate groups based on the polyisocyanate. To prepare foam, the remaining portion of the polyol is added and the components are allowed to react together in the presence of catalysts and other appropriate additives such as blowing agent, surfactant, etc. Other additives may be added to either the isocyanate prepolymer or remaining polyol or both prior to the mixing of the components, whereby at the end of the reaction a rigid polyurethane foam is provided.

The polyurethane foams of this invention are useful in a wide range of applications. Accordingly, not only can rigid appliance insulating foam be prepared but also spray insulation, rigid insulating board stock, laminates and many other types of rigid foam can easily be prepared according to this invention.

The following Examples are given as being illustrative thereof. All parts and percentages given in these Examples are parts by weight and percentages by weight, unless otherwise indicated.

EXAMPLES

The following materials were used in the Examples, which follow:

POLYOL A: A sulfuric acid neutralized o-TDA initiated polyether of ethylene oxide and propylene oxide (37 wt. % EO followed by 63 wt. % PO) having a functionality of 4 and an OH number of from about 385405 mg KOH/g.

POLYOL B: A lactic acid neutralized o-TDA initiated polyether of ethylene oxide and propylene oxide (35 wt. % EO followed by 65 wt. % PO) having a OH number of about 390 mg KOH/g and a functionality of about 4.

POLYOL C: A sucrose/propylene glycol/water based polyol (87:7:6) having a functionality of 5.8 and an OH number of from 370 to 390.

POLYOL D: An aromatic polyester polyol having an OH number of about 240 mg KOH/g which is commercially available under the designation Stepanpol PS-2502A from Stepan Company.

SURFACTANT: A silicon surfactant, which is commercially available under the designation Tegostab® B-8462 from Goldschmidt Company.
CATALYST A: (Pentamethyldiethylenetriamine) A tertiary amine catalyst that is commercially available from Rhein Chemie Corporation under the name Desmorapid PV.
CATALYST B: Dimethylcyclohexylamine, commercially available from Air Products under the name Polycat 8.
HCFC-141b: 1.1-dichloro-1-fluoroethane.
ISO: a polymeric diphenylmethane diisocyanate having an NCO group content of about 31.5%, a functionality of about 2.8, and a viscosity of about 196 mPa.s at 25° C.

Example 1

Preparation of the Polyol

Ortho-toluenediamine (o-TDA) was charged into a reactor. The reactor was sealed, one bar of nitrogen was added and the reaction mixture was heated to 115° C. The initial charge of ethylene oxide was added, as indicated in Table 1, and post reacted before catalyst addition then the catalyst was charged. After KOH addition, the nitrogen pad was replaced and the reaction mixture was heated to 150° C. and the remainder of the ethylene oxide was added. After post reaction, the propylene oxide block was added, and post reacted. Both EO and PO were fed at a rate sufficient to maintain the total reaction pressure between 45 and 60 psia. The reaction mixture was cooled to 90° C. and the KOH was neutralized with 110% of the theoretical amount of 88% aqueous lactic acid. After neutralization, a slight vacuum was pulled to remove residual oxides. Table 1 illustrates specific details and charge weights.

TABLE 1

| Polyol | Catalyst Level (wt. %) | % of oxide added prior to KOH addition | OH # (mg KOH/g) | Viscosity (mPa·s @ 25° C.) | Charge weights (g) |
|---|---|---|---|---|---|
| 1* | 0.2 | 37.0 | 415.7 | 11427 | o-TDA - 2634 EO - 3287 PO - 5597 |
| 2* | 0.1 | 37.0 | 408.9 | 13905 | o-TDA - 2870 EO - 3581 PO - 6098 |
| 3 | 0.05 | 12.2 | 406.4 | 9487 | o-TDA - 861 EO - 1077 PO - 1830 |
| 4 | 0.1 | 12.2 | 393 | 7770 | o-TDA - 833 EO - 1041 PO - 1770 |
| 5 | 0.05 | 24.7 | 401.1 | 9567 | o-TDA - 786 EO - 983 PO - 1670 |
| 6 | 0.1 | 24.7 | 394 | 8189 | o-TDA - 900 EO - 1126 PO - 1913 |

*Comparative Example

As shown in Table 1, Polyols 1 and 2 simply reducing the KOH concentration without any other processing change, which leads to an increased polyol viscosity. However, catalyst concentrations as low as 0.05% can be used to produce polyols without increasing the viscosity over the 0.2% catalyst containing samples, if the catalyst is added earlier in the alkoxylation step.

Example 2

Foam Formulations

The polyol components were combined in the proportions given in Table 2, blended and held at 26° C. prior to use. The isocyanate component (102 g) was brought to 26° C. and added to the polyol blend (100 g). The mixture was stirred with a mechanical mixer for 12 seconds before pouring into the sample container of the rigid foam tube, where the processing of foam was characterized.

The rigid foam tube consists of a water-jacketed (held at 35° C.) steel tube that is 150 cm long and has an internal diameter of 10 cm. The tube is equipped with a pressure transducer mounted flush with the inside wall of the tube, approximately 10 cm above the bottom of the tube. The inside of the tube is lined with a polyethylene film, to prevent the foam from adhering to the walls of the tube. A counterweighted "float" fits inside the tube and records the foam height as a function of time. The output from the float and the pressure transducer are digitized and fed to a personal computer.

A paper cup containing the sample prepared as described above is positioned at the bottom of the rigid foam tube, clamped in place and the data acquisition is started. Foam height and pressure readings versus time are collected for 600 seconds. The maximum rise height and maximum pressure recorded for each sample is reported in Table 3. The time at which the maximum in the second derivative of pressure with time occurs is reported in Table 3 as $T_{gel}$.

TABLE 2

| Component | Amount in Foam 1* | Amount in Foam 2 | Amount in Foam 3 | Amount in Foam 4* |
|---|---|---|---|---|
| POLYOL A | 55.5 | — | — | — |
| POLYOL 3 | — | 55.5 | — | — |
| POLYOL 5 | — | — | 55.5 | — |
| POLYOL B | — | — | — | 55.5 |
| POLYOL C | 15.9 | 15.9 | 15.9 | 15.9 |
| POLYOL D | 7.9 | 7.9 | 7.9 | 7.9 |
| SURFACTANT | 1.7 | 1.7 | 1.7 | 1.7 |
| WATER | 1.7 | 1.7 | 1.1 | 1.1 |
| CATALYST A | 0.2 | 0.2 | 0.2 | 0.2 |
| CATALYST B | 0.2 | 0.2 | 0.2 | 0.2 |
| ISO | 102 | 102 | 102 | 102 |
| HCFC 141b | 16.9 | 16.9 | 16.9 | 16.9 |

*Comparative Examples

The processing profile of each foam system was monitored using the previously described foam tube and the results appear in Table 3.

TABLE 3

RFT Data for Low Catalyst Blown Rigid Foam

| Foam According to Table 2 | Average Rise Height (cm) | Average $P_{max}$ (hPa) | Average $T_{gel}$ (s) |
|---|---|---|---|
| 1* | 107 | 128 | 107 |
| 2 | 106 | 134 | 116 |
| 3 | 105 | 134 | 98 |
| 4* | 104 | 237 | 73 |

*Comparative Examples

As illustrated in Table 3 foams produced with low KOH lactic acid neutralized polyols according to the present invention have gel times and maximum pressure during foaming more similar to those seen with a sulfuric acid neutralized polyol (Polyol A) than those produced with lactic acid neutralized polyol (Polyol B).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of short chain polyols comprising
   i) contacting an amine with a first alkylene oxide, wherein the amount of alkylene oxide contacted with the amine is between 5 and 30% of the total amount of alkylene oxide to be added to the amine,
   ii) adding from about 0.001 to 0.1 wt. % based on the weight of the finished polyol of an alkali metal hydroxide catalyst,
   iii) contacting the amine with the remaining amount of the first alkylene oxide and then a second alkylene oxide,
   iv) upon completion of the epoxidation, adding a hydroxy carboxylic acid to the epoxidized mixture, wherein the first alkylene oxide is a block of ethylene oxide and the second alkylene oxide is block of propylene oxide, wherein the amount of ethylene oxide used is about 20–40%, based on the total amount of alkylene oxide to be added to the amine, and wherein the amount of propylene oxide used is about 60–80%, based on the total amount of alkylene oxide to be added to the amine.

2. The process according to claim 1, wherein the amine is orthotoluenediamine.

3. The process according to claim 1, wherein the polyol has an average hydroxyl value of at least 200.

4. The process according to claim 3, wherein the polyol has an average hydroxyl value of from about 300 to about 500.

5. The process according to claim 1, wherein the alkali metal hydroxide catalyst is potassium hydroxide or sodium hydroxide.

6. The process according to claim 1, wherein the catalyst is added in an amount from about 0.05 to about 0.1 weight percent, based upon the weight of the polyol.

7. The process according to claim 6, wherein the catalyst is added in an amount from about 0.03 to about 0.07 weight percent, based upon the weight of the polyol.

8. The process according to claim 1, wherein the hydroxy carboxylic acid is lactic acid, salicylic acid, substituted salicylic acids such as 2-hydroxy 3-methyl benzoic acid, 2-hydroxy 4-methyl benzoic acid a mixture thereof.

9. The process according to claim 8, wherein the hydroxy carboxylic acid is lactic acid.

10. The process according to claim 1, wherein the hydroxy carboxylic acid is added at a level of 0.70 to 1.30 equivalents of carboxylic acid per equivalent of the alkali metal hydroxide used for the alkoxylation.

11. The process according to claim 10, wherein the hydroxy carboxylic acid is added at a level of 1.05 to 1.15 equivalents of carboxylic acid per equivalent of the alkali metal hydroxide used for the alkoxylation.

12. The process according to claim 9, wherein the lactic acid is added at a level of 0.70 to 1.30 equivalents of carboxylic acid per equivalent of the alkali metal hydroxide used for the alkoxylation.

13. A polyether polyol produced by the process according to claim 1.

14. A process for the production of a rigid foam comprising reacting an organic polyisocyanate with the polyol produced by the process according to claim 1.

15. The process according to claim 14, wherein the alkylene oxide is a block of ethylene oxide followed by a block of propylene oxide, wherein the amount of ethylene oxide used is about 20–40%, based on the total amount of alkylene oxide to be added to the amine, and
    wherein the amount of propylene oxide used is about 60–80%, based on the total amount of alkylene oxide to be added to the amine.

16. The process according to claim 14, wherein the amine is orthotoluenediamine.

17. The process according to claim 14, wherein the polyol has an average hydroxyl value of at least 200.

18. The process according to claim 17, wherein the polyol has an average hydroxyl value of from about 300 to about 500.

19. The process according to claim 14, wherein the alkali metal hydroxide catalyst is potassium hydroxide or sodium hydroxide.

20. The process according to claim 14, wherein the catalyst is added in an amount from about 0.05 to about 0.1 weight percent, based upon the weight of the polyol.

21. The process according to claim 20, wherein the catalyst is added in an amount from about 0.03 to about 0.07 weight percent, based upon the weight of the polyol.

22. The process according to claim 14, wherein the hydroxy carboxylic acid is lactic acid, salicylic acid, substituted salicylic acids such as 2-hydroxy 3-methyl benzoic acid, 2-hydroxy 4-methyl benzoic acid a mixture thereof.

23. The process according to claim 22, wherein the hydroxy carboxylic acid is lactic acid.

24. The process according to claim 14, wherein the hydroxy carboxylic acid is added at a level of 0.70 to 1.30 equivalents of carboxylic acid per equivalent of the alkali metal hydroxide used for the alkoxylation.

25. The process according to claim 24, wherein the hydroxy carboxylic acid is added at a level of 1.05 to 1.15 equivalents of carboxylic acid per equivalent of the alkali metal hydroxide used for the alkoxylation.

26. The process according to claim 23, wherein the lactic acid is added at a level of 0.70 to 1.30 equivalents of carboxylic acid per equivalent of the alkali metal hydroxide used for the alkoxylation.

* * * * *